United States Patent
Tsai et al.

(10) Patent No.: US 10,686,331 B2
(45) Date of Patent: **\*Jun. 16, 2020**

(54) SIGNAL MODULATION METHOD AND SIGNAL RECTIFICATION AND MODULATION DEVICE

(71) Applicant: Fu Da Tong Technology Co., Ltd., New Taipei (TW)

(72) Inventors: Ming-Chiu Tsai, New Taipei (TW); Chi-Che Chan, New Taipei (TW)

(73) Assignee: Fu Da Tong Technology Co., Ltd., New Taipei (TW)

( * ) Notice: Subject to any disclaimer, the term of this patent is extended or adjusted under 35 U.S.C. 154(b) by 441 days.

This patent is subject to a terminal disclaimer.

(21) Appl. No.: 15/729,652

(22) Filed: Oct. 10, 2017

(65) Prior Publication Data

US 2018/0034281 A1 Feb. 1, 2018

Related U.S. Application Data

(60) Division of application No. 14/731,421, filed on Jun. 5, 2015, now Pat. No. 10,038,338, which is a
(Continued)

(30) Foreign Application Priority Data

| Feb. 1, 2011 | (TW) | ............................. 100103836 A |
| May 3, 2013 | (TW) | ............................. 102115983 A |
| Jun. 2, 2015 | (TW) | ............................. 104117722 A |

(51) Int. Cl.
*H02J 50/10* (2016.01)
*H04B 5/00* (2006.01)
(Continued)

(52) U.S. Cl.
CPC ............. *H02J 50/10* (2016.02); *G06F 1/26* (2013.01); *G06F 1/266* (2013.01); *H02J 5/005* (2013.01);
(Continued)

(58) Field of Classification Search
CPC .. H02J 50/10; H02J 5/005; H02J 50/80; H02J 50/12; G06F 1/266; G06F 1/26; H04B 5/0037; H04B 5/0081

See application file for complete search history.

(56) References Cited

U.S. PATENT DOCUMENTS

| 3,573,817 A | 4/1971 | Akers |
| 8,731,116 B2 | 5/2014 | Norconk |

(Continued)

FOREIGN PATENT DOCUMENTS

| CN | 101399464 A | 4/2009 |
| CN | 101924399 A | 12/2010 |

(Continued)

OTHER PUBLICATIONS

Ma et al., Analysis of metal foreign object setting on electric vehicle wireless power transfer system, <Advanced Technology of Electrical Engineering and Energy> vol. 36, No. 2, p. 14-20, Feb. 28, 2017.

*Primary Examiner* — Pinping Sun
(74) *Attorney, Agent, or Firm* — Winston Hsu

(57) ABSTRACT

A signal modulation method for a receiving-end module of an induction type power supply system includes configuring a plurality of modulation periods corresponding to a modulation signal; performing modulation on a first terminal of an induction coil of the receiving-end module during the $i^{th}$ modulation period among the plurality of modulation periods, wherein i is an odd number; and performing modulation on a second terminal of the induction coil of the receiving-end module during the $j^{th}$ modulation period among the
(Continued)

plurality of modulation periods, wherein j is an even number; wherein the second terminal does not undergo modulation when the first terminal is being modulated, and the first terminal does not undergo modulation when the second terminal is being modulated.

17 Claims, 12 Drawing Sheets

Related U.S. Application Data continuation-in-part of application No. 14/017,321, filed on Sep. 4, 2013, now Pat. No. 9,628,147, and a continuation-in-part of application No. 13/541,090, filed on Jul. 3, 2012, now Pat. No. 9,075,587, and a continuation-in-part of application No. 13/212,564, filed on Aug. 18, 2011, now Pat. No. 8,941,267, which is a continuation-in-part of application No. 13/154,965, filed on Jun. 7, 2011, now Pat. No. 8,810,072.

(51) Int. Cl.
 G06F 1/26 (2006.01)
 H02J 50/12 (2016.01)
 H02J 50/80 (2016.01)
 H02J 5/00 (2016.01)

(52) U.S. Cl.
 CPC .............. *H02J 50/12* (2016.02); *H02J 50/80* (2016.02); *H04B 5/0037* (2013.01); *H04B 5/0081* (2013.01)

(56) References Cited

U.S. PATENT DOCUMENTS

| | | | |
|---|---|---|---|
| 9,143,002 B2* | 9/2015 | Yeo | H02J 50/12 |
| 9,318,897 B2* | 4/2016 | Brohlin | H02J 5/005 |
| 9,531,444 B2* | 12/2016 | Bae | H02M 7/06 |
| 9,553,485 B2 | 1/2017 | Singh | |
| 9,995,777 B2 | 6/2018 | Von Novak, III | |
| 10,056,944 B2 | 8/2018 | Tsai | |
| 10,122,220 B2 | 11/2018 | Sankar | |
| 2005/0258826 A1 | 11/2005 | Kano | |
| 2008/0106273 A1 | 5/2008 | Bauer | |
| 2009/0167300 A1 | 7/2009 | Cech | |
| 2009/0278651 A1 | 11/2009 | Okada | |
| 2009/0319212 A1 | 12/2009 | Cech | |
| 2010/0098177 A1 | 4/2010 | Hamaguchi | |
| 2010/0213590 A1 | 8/2010 | Warren | |
| 2010/0225173 A1* | 9/2010 | Aoyama | H02J 5/005 307/104 |
| 2011/0062793 A1 | 3/2011 | Azancot | |
| 2011/0097996 A1 | 4/2011 | Kalanithi | |
| 2011/0199046 A1* | 8/2011 | Tsai | H02J 7/025 320/108 |
| 2011/0241436 A1 | 10/2011 | Furukawa | |
| 2012/0169132 A1 | 7/2012 | Choudhary | |
| 2013/0057079 A1 | 3/2013 | Park | |
| 2013/0065518 A1 | 3/2013 | Byun | |
| 2013/0082653 A1 | 4/2013 | Lee | |
| 2013/0106197 A1 | 5/2013 | Bae | |
| 2013/0147279 A1* | 6/2013 | Muratov | H02J 5/005 307/104 |
| 2013/0162054 A1 | 6/2013 | Komiyama | |
| 2013/0234503 A1 | 9/2013 | Ichikawa | |
| 2014/0015329 A1 | 1/2014 | Widmer | |
| 2014/0197783 A1* | 7/2014 | Kim | H02J 50/12 320/108 |
| 2014/0333153 A1 | 11/2014 | Tanaka | |
| 2014/0339907 A1 | 11/2014 | Omae | |
| 2015/0162054 A1 | 6/2015 | Ishizu | |
| 2015/0180286 A1 | 6/2015 | Asanuma | |
| 2015/0263531 A1 | 9/2015 | Kozakai | |
| 2015/0285926 A1 | 10/2015 | Oettinger | |
| 2015/0349573 A1* | 12/2015 | Tschirhart | H02J 50/12 320/108 |
| 2015/0372493 A1 | 12/2015 | Sankar | |
| 2015/0372662 A1* | 12/2015 | Niessen | H03H 11/04 307/104 |
| 2016/0064951 A1 | 3/2016 | Yamamoto | |
| 2016/0064952 A1 | 3/2016 | Matsumoto | |
| 2016/0072336 A1 | 3/2016 | Tamino | |
| 2018/0138756 A1 | 5/2018 | Bae | |
| 2018/0241257 A1 | 8/2018 | Muratov | |

FOREIGN PATENT DOCUMENTS

| | | |
|---|---|---|
| CN | 102054057 A | 5/2011 |
| CN | 102055250 A | 5/2011 |
| CN | 102157991 A | 8/2011 |
| CN | 102396131 A | 3/2012 |
| CN | 202404630 U | 8/2012 |
| CN | 103852631 A | 6/2014 |
| CN | 103855764 A | 6/2014 |
| CN | 103999325 A | 8/2014 |
| CN | 104160300 A | 11/2014 |
| CN | 104253492 A | 12/2014 |
| CN | 204190475 U | 3/2015 |
| CN | 105226845 A | 1/2016 |
| CN | 105308829 A | 2/2016 |
| CN | 106094041 A | 11/2016 |
| CN | 106134037 A | 11/2016 |
| CN | 106560730 A | 4/2017 |
| CN | 106571692 A | 4/2017 |
| CN | 106685029 A | 5/2017 |
| CN | 107615612 A | 1/2018 |
| EP | 2 555 107 A1 | 2/2013 |
| EP | 3 160 008 A1 | 4/2017 |
| JP | 2013132133 A | 7/2013 |
| JP | 2016-75484 A | 5/2016 |
| JP | 6122402 | 4/2017 |
| JP | 2017511117 A | 4/2017 |
| TW | 201513523 A | 4/2015 |
| TW | 201605143 A | 2/2016 |
| TW | I577108 B | 4/2017 |
| TW | I596546 B | 8/2017 |
| TW | I604678 B | 11/2017 |
| WO | 2015154086 A1 | 10/2015 |
| WO | 2016/159788 A1 | 10/2016 |
| WO | 2016/181658 A1 | 11/2016 |

* cited by examiner

US 10,686,331 B2

SIGNAL MODULATION METHOD AND SIGNAL RECTIFICATION AND MODULATION DEVICE

CROSS REFERENCE TO RELATED APPLICATIONS

This application is a divisional application of U.S. application Ser. No. 14/731,421, filed on Jun. 5, 2015, which is a continuation-in-part application of U.S. application Ser. No. 14/017,321, filed on Sep. 4, 2013, and a continuation-in-part application of U.S. application Ser. No. 13/541,090, filed on Jul. 3, 2012. U.S. application Ser. No. 14/017,321 is further a continuation-in-part application of U.S. application Ser. No. 13/541,090, filed on Jul. 3, 2012, and a continuation-in-part application of U.S. application Ser. No. 13/212,564, filed on Aug. 18, 2011, which is further a continuation-in-part application of U.S. application Ser. No. 13/154,965, filed on Jun. 7, 2011.

BACKGROUND OF THE INVENTION

1. Field of the Invention

The present invention relates to a signal modulation method and a signal rectification and modulation device, and more particularly, to an alternation-type signal modulation method and a related signal rectification and modulation device.

2. Description of the Prior Art

For safety purposes, a power supply device of an induction type power supply system has to ensure that a proper power receiving device is positioned on the sensing area of a supplying-end coil of the power supply device, and that the power receiving device is ready to receive power before the power is supplied. In order to allow the power supply device to confirm the above conditions, a data code should be transmitted for identification purposes. The data code transmission is performed via the following steps: the power supply device drives the supplying-end coil to generate resonance and sends electromagnetic power to the power receiving device in order to transmit power. When the power receiving device receives the power, the power receiving device may change the impedance on the receiving-end coil via the signal modulation technology, and the variations are fed back to vary the amplitude of carriers on the supplying-end coil.

The data code is composed of a plurality of modulation signals. In the prior art, the power receiving device performs signal modulation on both terminals of the induction coil at the same time. For example, as shown in the receiving-end module 20 of U.S. Publication No. 2013/0342027 A1, the receiving-end microprocessor 21 simultaneously turns on the switches A6 and B6 respectively corresponding to the two terminals of the induction coil, in order to perform modulation on both terminals of the induction coil simultaneously. In detail, during a modulation period, the switches A6 and B6 may be turned on simultaneously, so that the signal modulation resistors A3 and B3 may perform modulation simultaneously. At this moment, due to operations of the control diodes A4 and B4, the low-side switches A2 and B2 may stop performing rectification at the same time. In such a situation, in order to increase the amplitude of the signals reflected to the supplying-end coil, the modulation time should be increased, which prolongs the time when the rectifier stops operating, such that the power supply capability for the back-end circuits may be reduced. On the other hand, the signals reflected to the power supply device may become larger when the resistance values of the signal modulation resistors A3 and B3 become smaller, and this also brings about a larger power loss during the modulation period. In other words, another method to realize the amplification of reflection signals is to reduce the signal modulation resistors, but the reduction range is still limited to the bottleneck of power loss.

In addition, the low-side switches A2 and B2 for performing rectification are connected to the induction coil via the protection resistors B1 and A1, respectively. The gate voltages of the low-side switches A2 and B2 are controlled by the coil voltage, so that the low-side switches A2 and B2 may be turned on or off to perform rectification operations. However, in order to increase the operational speed of the low-side switches A2 and B2, the resistance values of the protection resistors A1 and B1 should be reduced to increase the charging/discharging speed on the gate terminals of the low-side switches A2 and B2. In such a condition, the protection resistors A1 and B1 having a lower resistance value will cause the zener diodes A5 and B5 to accept larger power and thus to be burnt easily. As a result, the switching speed of rectification is also limited.

On the other hand, in the receiving-end module 20 of U.S. Publication No. 2013/0342027 A1, the voltage stabilizer circuit 25 applies the regulating capacitor 251 to stabilize the output voltage. Since the regulating capacitor 251 always has a larger capacitance, the protection circuit breaker 24 is disposed between the regulating capacitor 251 and the rectifier and signal feedback circuit 23, in order to allow power to be used by the receiving-end microprocessor 21 first and prevent the regulating capacitor 251 from absorbing too more charges causing that the receiving-end microprocessor 21 fails to be turned on when the supplying-end module 10 and the receiving-end module 20 start to interact and the rectifier and signal feedback circuit 23 starts to output power. In addition, when the receiving-end coil 271 just departs from a power supply device, there are still a large number of charges existing in the regulating capacitor 251. These charges may flow back to the receiving-end microprocessor 21 to cause the receiving-end microprocessor 21 unable to determine whether it is in a power supply phase. Moreover, the above circuit structure may possess another problem. When the receiving-end module 20 just detects that power arrives, the protection circuit breaker 24 is turned off; that is, the rectifier and signal feedback circuit 23 is not connected to a large capacitor (i.e., the regulating capacitor 251) which is able to help receive charges, such that an instant high voltage input may burn the circuit elements. In addition, at the instant where the protection circuit breaker 24 is turned on, the regulating capacitor 251 starts to receive a large number of charges, which instantly decreases the operation voltage of the receiving-end microprocessor 21, and thereby causes the receiving-end microprocessor 21 to stop operating or generates other ill effects.

Please refer to FIG. 1, which is a waveform diagram of signal modulation. As shown in FIG. 1, the waveform W1_1 illustrates signals on the gate terminals of the switches A6 and B6 in the receiving-end module 20 described in U.S. Publication No. 2013/0342027 A1, where the signals simultaneously turn on the switches A6 and B6 in a high voltage level, in order to generate modulation signals. The waveform W1_2 illustrates signals obtained from the modulation signals reflected to the power supply device and then processed by the signal analysis circuit 13. As shown in the waveform W1_2, the signals in the power supply device fed back from every modulation signals vary in amplitude, this is because the modulation control signals (i.e., the signals on the gate terminals of the switches A6 and B6) are not synchronous with oscillation cycles of the coil. In other words, the modulation signals randomly occur on the oscillation cycles of the supplying-end coil. Therefore, the starting point corresponding to the oscillation cycles and the oscillation number of times reflected to the supplying-end coil in each modulation period are not fixed, such that the amplitude variations on the supplying-end coil due to signal modulation are not fixed as well. In U.S. Publication No. 2013/0342027 A1, the power supply device may automatically adjust the voltage level for signal determination according to signal variations on the coil, so signal variations with different amplitudes may easily cause wrong determination.

Furthermore, please refer to FIG. 2, which is a waveform diagram of signals in a signal modulation period. As shown in FIG. 2, the waveform W2_1 illustrates signals on the gate terminals of the switches A6 and B6 in the receiving-end module 20 described in U.S. Publication No. 2013/0342027 A1, where the signals simultaneously turn on the switches A6 and B6 in a high voltage level, in order to generate modulation signals. The waveform. W2_2 illustrates the gate voltage of the low-side switch B2. As shown in FIG. 2, during the modulation, operations of the control diodes A4 and B4 allow the low-side switches A2 and B2 to stop performing rectification simultaneously; that is, the gate voltage of the low-side switches A2 and B2 should be zero, in order to turn off the low-side switches A2 and B2. As shown by the waveform W2_2 in FIG. 2, however, a voltage still remains in the gate terminal of the low-side switch B2 and the gate voltage does not exactly reach a zero voltage and keep on the zero voltage during the modulation period (i.e., the period where the signals on the gate terminals of the switches A6 and B6 are in the high voltage level). Therefore, the low-side switch B2 cannot be fully turned off, such that redundant power consumption is generated during the modulation process.

As can be seen, many problems in the prior art still need to be solved. Thus, there is a need to provide a signal modulation method, which allows the receiving-end module to generate modulation signals more effectively and also overcome the above drawbacks.

SUMMARY OF THE INVENTION

It is therefore an objective of the present invention to provide a signal modulation method and a related signal rectification and modulation device, to effectively generate modulation signals and solve the above problems.

The present invention discloses a signal modulation method for a receiving-end module of an induction type power supply system. The signal modulation method comprises configuring a plurality of modulation periods corresponding to a modulation signal; performing modulation on a first terminal of an induction coil of the receiving-end module during the $i^{th}$ modulation period among the plurality of modulation periods, wherein i is an odd number; and performing modulation on a second terminal of the induction coil of the receiving-end module during the $i^{th}$ modulation period among the plurality of modulation periods, wherein j is an even number; wherein the second terminal does not undergo modulation when the first terminal is being modulated, and the first terminal does not undergo modulation when the second terminal is being modulated.

The present invention further discloses a signal rectification and modulation device for a receiving-end module of an induction type power supply system. The receiving-end module comprises an induction coil for receiving power from a supplying-end module of the induction type power supply system. The rectification and modulation device comprises a first rectification transistor, a second rectification transistor, a first rectification control module, a second rectification control module, a first modulation control module, a second modulation control module and a processor. The first rectification transistor, coupled between a first terminal of the induction coil and a ground terminal, is used for performing rectification on the first terminal of the induction coil. The second rectification transistor, coupled between a second terminal of the induction coil and the ground terminal, is used for performing rectification on the second terminal of the induction coil. The first rectification control module, coupled to the first terminal and the second terminal of the induction coil and the first rectification transistor, is used for outputting a first rectification control signal to control the first rectification transistor to perform rectification according to voltages on the first terminal and the second terminal of the induction coil. The second rectification control module, coupled to the first terminal and the second terminal of the induction coil and the second rectification transistor, is used for outputting a second rectification control signal to control the second rectification transistor to perform rectification according to the voltages on the first terminal and the second terminal of the induction coil. The first modulation control module, coupled to the first terminal of the induction coil, is used for performing signal modulation on the first terminal. The second modulation control module, coupled to the second terminal of the induction coil, is used for performing signal modulation on the second terminal. The processor, coupled to the comparator, the first rectification control module, the second rectification control module, the first modulation control module and the second modulation control module, is used for controlling the first modulation control module and the second modulation control module to alternately perform modulation on the first terminal and the second terminal of the induction coil. The processor controls the second rectification control module to turn off the second rectification transistor to interrupt the rectification on the second terminal of the induction coil when controlling the first modulation control module to perform modulation on the first terminal of the induction coil, and controls the first rectification control module to turn off the first rectification transistor to interrupt the rectification on the first terminal of the induction coil when controlling the second modulation control module to perform modulation on the second terminal of the induction coil.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
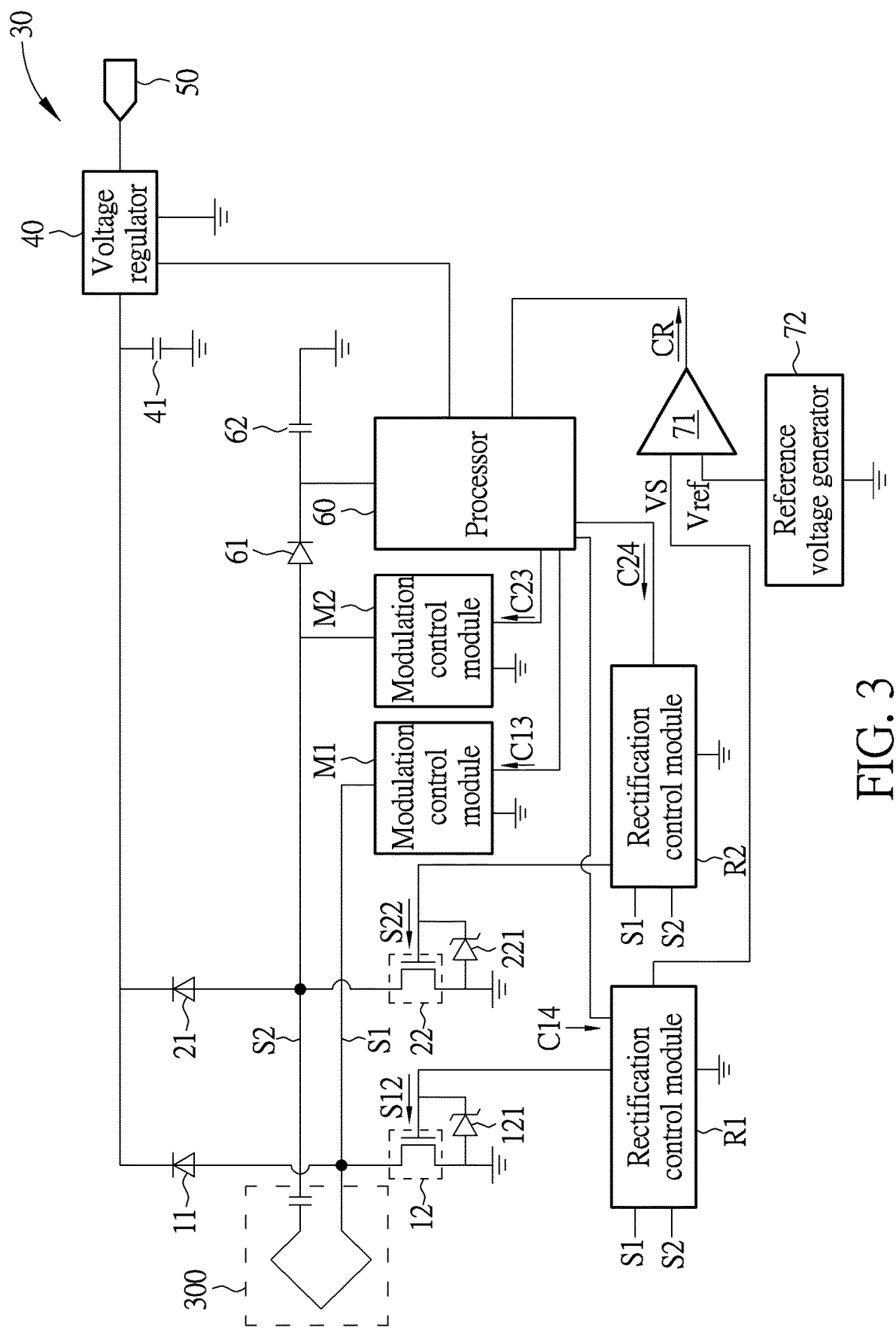
FIG. 3 is a schematic diagram of a receiving-end module according to an embodiment of the present invention.

Please refer to FIG. 3, which is a schematic diagram of a receiving-end module 30 according to an embodiment of the present invention. The receiving-end module 30 is used for an induction type power supply system, for receiving power from a corresponding supplying-end module of the induction type power supply system. As shown in FIG. 3, the receiving-end module 30 includes an induction coil 300, rectification diodes 11 and 21, rectification transistors 12 and 22, protection diodes 121 and 221, rectification control modules R1 and R2, modulation control modules M1 and M2, a reference voltage generator 72, a comparator 71, a processor 60, a voltage regulator 40 and a power output terminal 50. In addition, in order to provide a stable operation voltage for the processor 60, the receiving-end module 30 further includes a rectification diode 61 and a filtering capacitor 62, disposed in a power input terminal of the processor 60. In order to provide stable input power for the voltage regulator 40, the receiving-end module 30 further includes a regulating capacitor 41, having a larger capacitance value, disposed in a power input terminal of the voltage regulator 40.

The induction coil 300, which includes a coil and a capacitor, is able to resonate with the coil in the supplying-end module, in order to generate power and feedback modulation signals and data to the supplying-end module. The rectification diode 11, coupled between a first terminal S1 of the induction coil 300 and the power output terminal 50, may output power to the power output terminal 50 via the voltage regulator 40. The rectification diode 21, coupled between a second terminal S2 of the induction coil 300 and the power output terminal 50, may output power to the power output terminal 50 via the voltage regulator 40. The rectification diodes 11 and 21 may output power to the power output terminal 50 in different phases. The rectification transistor 12, coupled between the first terminal S1 of the induction coil 300 and the ground terminal, is used for performing rectification on the first terminal S1 of the induction coil 300. The rectification transistor 22, coupled between the second terminal S2 of the induction coil 300 and the ground terminal, is used for performing rectification on the second terminal S2 of the induction coil 300. The rectification control module R1, coupled to the first terminal S1 and the second terminal S2 of the induction coil 300 and the rectification transistor 12, may output a rectification control signal S12 to the rectification transistor 12, to control the rectification transistor 12 to perform rectification according to voltages on the first terminal S1 and the second terminal S2 of the induction coil 300. The rectification control module R2, coupled to the first terminal S1 and the second terminal S2 of the induction coil 300 and the rectification transistor 22, may output a rectification control signal S22 to the rectification transistor 22, to control the rectification transistor 22 to perform rectification according to voltages on the first terminal S1 and the second terminal S2 of the induction coil 300. In this case, both of the rectification transistors 12 and 22 are an N-type metal oxide semiconductor field-effect transistor (NMOS transistor); hence, the rectification control signal S12 or S22 may turn on the rectification transistor 12 or 22 when it is in a higher voltage level, and turn off the rectification transistor 12 or 22 when it is in a lower voltage level.

In detail, when a current of the induction coil 300 is outputted from the rectification diode 11, the first terminal S1 of the induction coil 300 is in a higher voltage level and the second terminal S2 of the induction coil 300 is in a lower voltage level. At this moment, the rectification control module R2 may turn on the rectification transistor 22 to allow a current to flow to the induction coil 300 from the ground terminal according to the voltage relations of the first terminal S1 and the second terminal S2 of the induction coil 300, in order to achieve a balance. When a current of the induction coil 300 is outputted from the rectification diode 21, the second terminal S2 of the induction coil 300 is in a higher voltage level and the first terminal S1 of the induction coil 300 is in a lower voltage level. At this moment, the rectification control module R1 may turn on the rectification transistor 12 to allow a current to flow to the induction coil 300 from the ground terminal according to the voltage relations of the first terminal S1 and the second terminal S2 of the induction coil 300, in order to achieve a balance. The protection diodes 121 and 221 are respectively coupled between the gate terminals of the rectification transistors 12 and 22 and the ground terminal, for limiting the gate voltages of the rectification transistors 12 and 22 within a specific range. That is, according to the characteristics of the rectification transistors 12 and 22, the protection diodes 121 and 221 may respectively restrict the gate voltages of the rectification transistors 12 and 22 to be under an upper limit, in order to prevent the gate voltages of the rectification transistors 12 and 22 from exceeding the withstand voltage of the rectification transistors 12 and 22, causing the rectification transistors 12 and 22 to be burnt. In general, the protection diodes 121 and 221 may be realized by a zener diode, but should not be limited herein.

Please keep referring to FIG. 3. The modulation control module M1, coupled to the first terminal S1 of the induction coil 300, is used for performing signal modulation on the first terminal S1. The modulation control module M2, coupled to the second terminal S2 of the induction coil 300, is used for performing signal modulation on the second terminal S2. The operations of the modulation control modules M1 and M2 are controlled by the processor 60. In detail, the processor 60 may turn off the rectification transistor 22 via the rectification control module R2 to interrupt the rectification on the second terminal S2 of the induction coil 300 when controlling the modulation control module M1 to perform modulation on the first terminal S1 of the induction coil 300. On the other hand, the processor 60 may turn off the rectification transistor 12 via the rectification control module R1 to interrupt the rectification on the first terminal S1 of the induction coil 300 when controlling the modulation control module M2 to perform modulation on the second terminal S2 of the induction coil 300.

The reference voltage generator 72 is used for generating a reference voltage Vref for the comparator 71. The comparator 71, coupled to the reference voltage generator 72 and the rectification control module R1, is used for comparing the reference voltage Vref with a coil voltage VS of the induction coil 300 to generate a comparison result CR, and outputting the comparison result CR to the processor 60. In detail, the comparator 71 may compare the coil voltage VS on the first terminal S1 or the second terminal S2 of the induction coil 300 with the reference voltage Vref, to generate the comparison result CR. In the receiving-end module 30 shown in FIG. 3, an input terminal of the comparator 71 is coupled to the rectification control module R1, for receiving the coil voltage VS from the first terminal S1 of the induction coil 300, and then comparing the coil voltage VS with the reference voltage Vref. In another embodiment, the input terminal of the comparator 71 may be coupled to the rectification control module R2, for receiving the coil voltage VS from the second terminal S2 of the induction coil 300, and then comparing the coil voltage VS with the reference voltage Vref.

In addition, the processor 60, coupled to the comparator 71, the rectification control modules R1 and R2, and the modulation control modules M1 and M2, is used for controlling the modulation control modules M1 and M2 to alternately perform signal modulation on the first terminal S1 and the second terminal S2 of the induction coil 300 according to the comparison result CR. In detail, the processor 60 may output modulation control signals C13 and C23, respectively, to control the modulation control modules M1 and M2 to perform modulation in different time. The processor 60 may also correspondingly output rectification stop control signals C14 and C24, respectively, to respectively control the rectification control modules R1 and R2 to stop rectification when the modulation is performed. The processor 60 may be a microprocessor, a micro controller unit (MCU) or any other type of processing device. In addition, the voltage regulator 40, controlled by the processor 60, is used for receiving power from the induction coil 300. The regulating capacitor 41 is coupled between the voltage regulator 40 and the rectification diodes 11 and 21, for stabilizing the power received by the voltage regulator 40.

In contrast to the prior art where the receiving-end module performs signal modulation on both terminals of the induction coil at the same time, the present invention performs signal modulation on the two terminals of the induction coil in an alternation manner. In other words, in the embodiments of the present invention, the processor alternately turns on the two modulation control modules, to respectively perform signal modulation on the first terminal and the second terminal of the induction coil during different modulation periods. The detailed operations are described as follows.

Figure 4A:
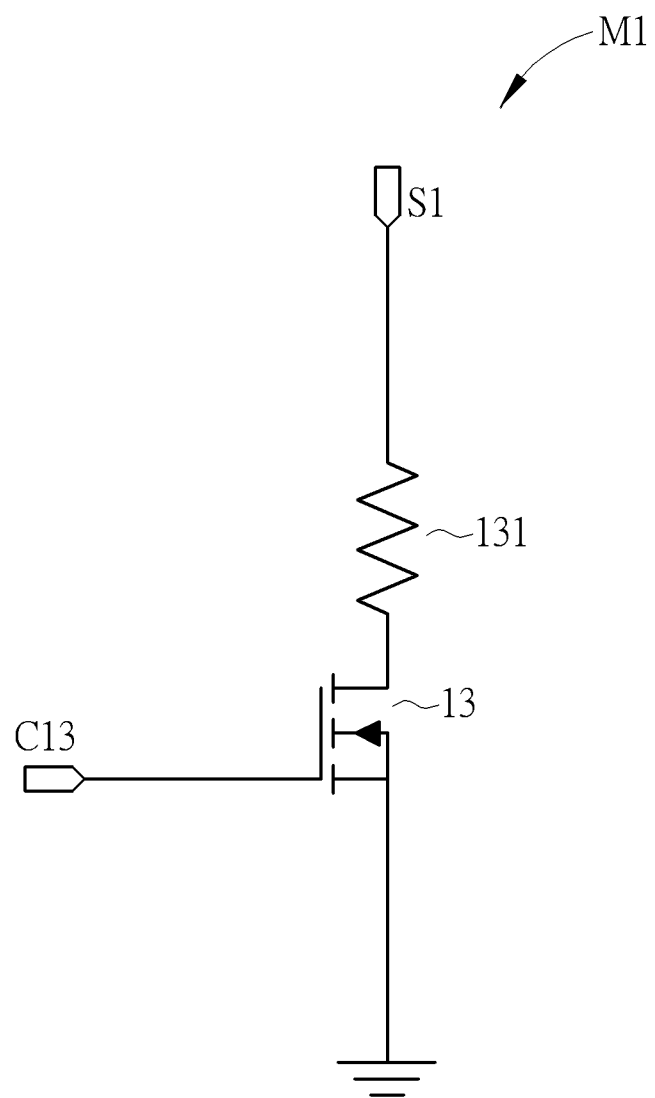
FIG. 4A and FIG. 4B are schematic diagrams of implementations of the modulation control modules shown in FIG. 3.
Figure 4B:
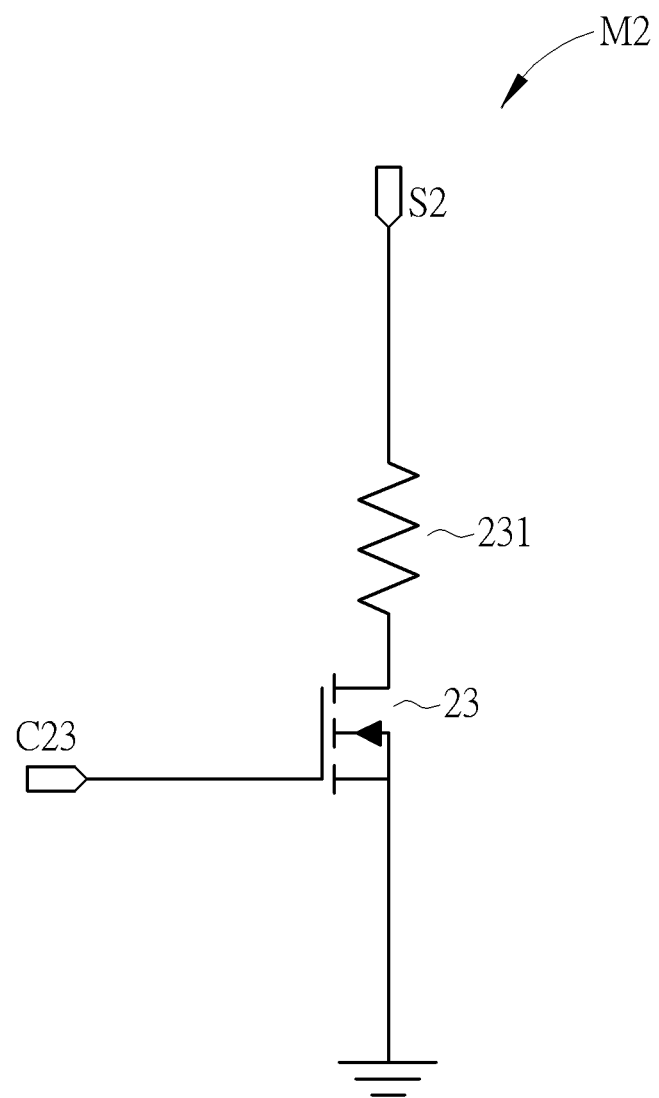

Please refer to FIG. 4A and FIG. 4B, which are schematic diagrams of implementations of the modulation control modules M1 and M2 shown in FIG. 3, respectively. As shown in FIG. 4A, the modulation control module M1 includes a modulation transistor 13 and a modulation load resistor 131. The modulation transistor 13, controlled by the processor 60, is used for performing modulation on the first terminal S1 of the induction coil 300. The modulation load resistor 131, coupled between the modulation transistor 13 and the first terminal S1 of the induction coil 300, is used for providing a load required by the modulation. In detail, the processor 60 may output the modulation control signal C13 to the modulation transistor 13, to turn on or turnoff the modulation transistor 13. When the modulation transistor 13 is turned on, impedance between the first terminal S1 of the induction coil 300 and the ground terminal may change, which varies the electrical characteristics on the induction coil 300. Such variations of the electrical characteristics may be fed back to the power supply device and then analyzed and decoded to return to the modulation data in the power supply device. In this case, the modulation transistor 13 is an NMOS transistor, which may be turned on when the modulation control signal C13 is in a higher voltage level, and turned off when the modulation control signal C13 is in a lower voltage level. On the other hand, as shown in FIG. 4B, the modulation control module M2 includes a modulation transistor 23 and a modulation load resistor 231. The modulation transistor 23, controlled by the processor 60, is used for performing modulation on the second terminal S2 of the induction coil 300. The modulation load resistor 231, coupled between the modulation transistor 23 and the second terminal S2 of the induction coil 300, is used for providing a load required by the modulation. Similarly, the processor 60 may turn on or turn off the modulation transistor 23 via the modulation control signal C23. For the detailed operations related to the modulation control module M2, the reader may be referred to the above descriptions of the modulation control module M1; this will not be narrated herein.

Figure 5A:
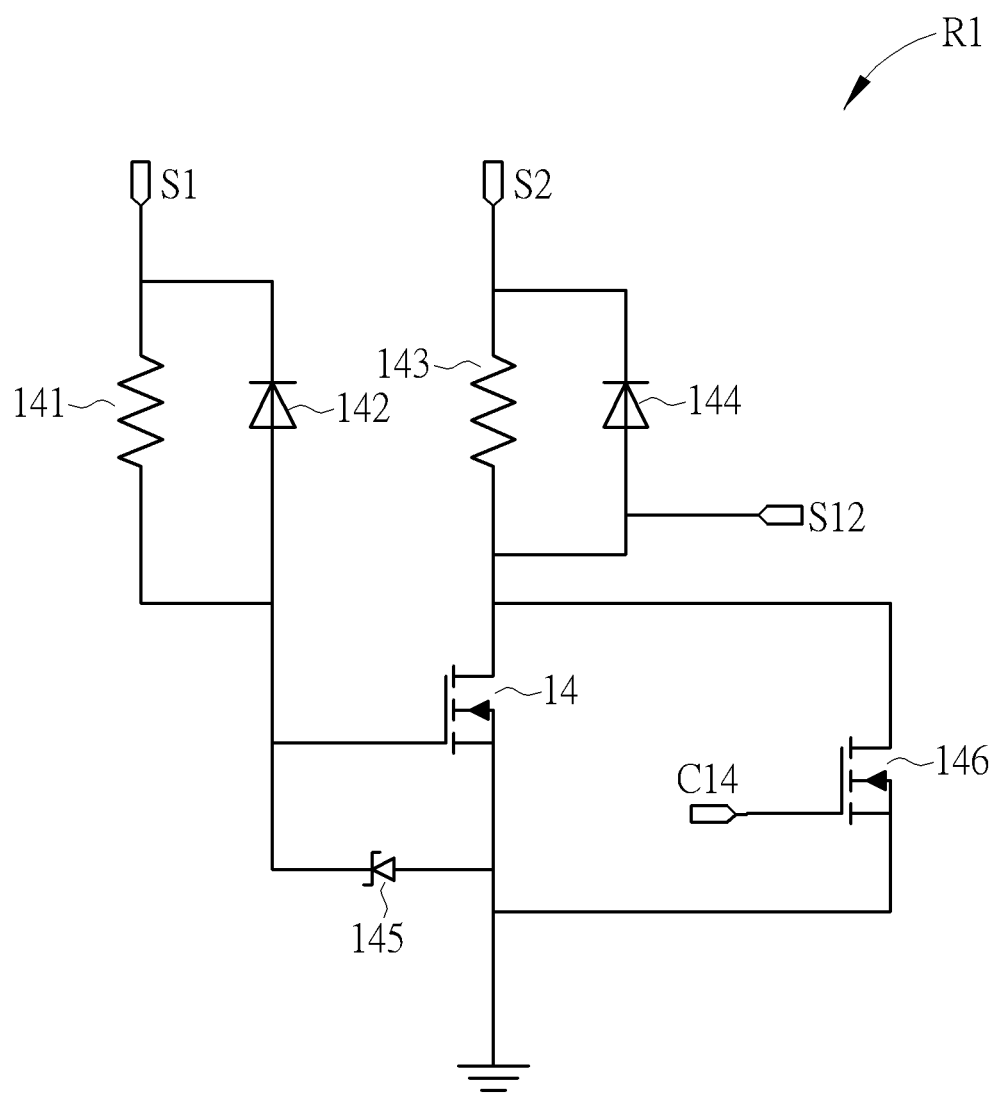
FIG. 5A and FIG. 5B are schematic diagrams of implementations of the rectification control modules shown in FIG. 3.
Figure 5B:
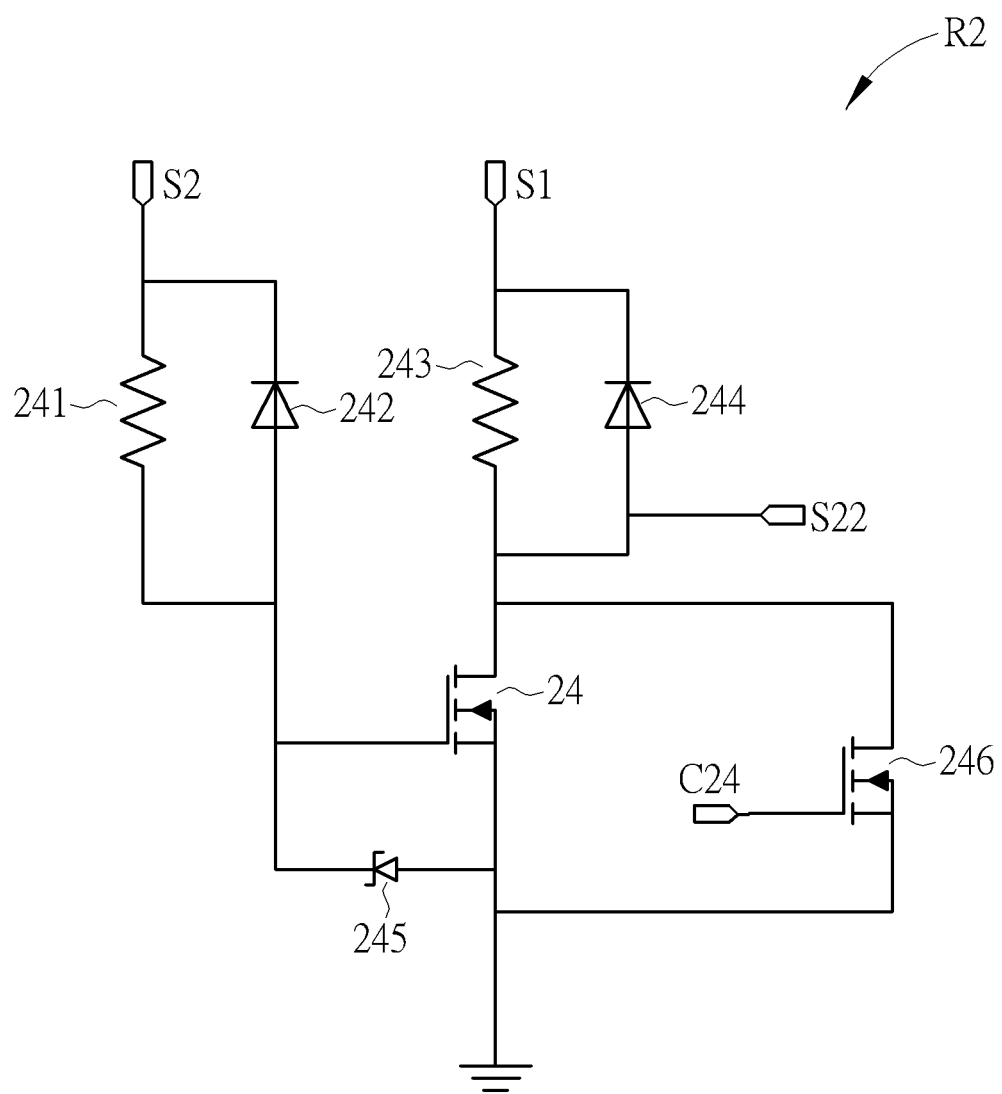

Please refer to FIG. 5A and FIG. 5B, which are schematic diagrams of implementations of the rectification control modules R1 and R2 shown in FIG. 3, respectively. As shown in FIG. 5A, the rectification control module R1 includes a rectification control transistor 14, voltage transformer resistors 141 and 143, discharge acceleration diodes 142 and 144, a rectification stop control transistor 146 and a protection diode 145. The rectification control transistor 14 is an NMOS transistor, of which the drain terminal is coupled to the rectification transistor 12, for outputting the rectification control signal S12 to the rectification transistor 12; the source terminal is coupled to the ground terminal; and the gate terminal is coupled to the first terminal S1 of the induction coil 300 via the voltage transformer resistor 141 and the discharge acceleration diode 142, to be controlled by the voltage on the first terminal S1 of the induction coil 300. When the rectification control transistor 14 is turned on, the rectification control signal S12 may reach the zero voltage, in order to fully turn off the rectification transistor 12. The voltage transformer resistor 141 is coupled between the first terminal S1 of the induction coil 300 and the gate terminal of the rectification control transistor 14, for controlling the gate voltage of the rectification control transistor 14 to vary with the voltage on the first terminal S1 of the induction coil 300. Further, the discharge acceleration diode 142 is also coupled between the first terminal S1 of the induction coil 300 and the gate terminal of the rectification control transistor 14. When the voltage on the first terminal S1 of the induction coil 300 decreases, the discharge acceleration diode 142 may accelerate the speed of decreasing the gate voltage of the rectification control transistor 14 to rapidly turn off the rectification control transistor 14, in order to accelerate the speed of increasing the rectification control signal S12. In other words, the gate voltage of the rectification control transistor 14 may vary with the voltage on the first terminal S1 of the induction coil 300, to turn on the rectification control transistor 14 when the voltage on the first terminal S1 of the induction coil 300 increases, in order to turn off the rectification transistor 12 to stop the rectification performed on the first terminal S1. In addition, the operations of the discharge acceleration diode 142 allow the gate terminal of the rectification control transistor 14 to discharge rapidly when the voltage on the first terminal S1 of the induction coil 300 decreases, in order to accelerate the speed of turning off the rectification control transistor 14. As a result, the turned-on speed of the rectification transistor 12 may be increased during the rectification switching process.

The voltage transformer resistor 143 is coupled between the second terminal S2 of the induction coil 300 and the drain terminal of the rectification control transistor 14, for controlling the rectification control signal S12 to vary with the voltage on the second terminal S2 of the induction coil 300. Further, the discharge acceleration diode 144 is also coupled between the second terminal S2 of the induction coil 300 and the drain terminal of the rectification control transistor 14. When the voltage on the second terminal S2 of the induction coil 300 decreases, the discharge acceleration diode 144 may accelerate the speed of decreasing the voltage of the rectification control signal S12. In other words, the rectification control signal S12 may vary with the voltage on the second terminal S2 of the induction coil 300, to turn on the rectification transistor 12 when the voltage on the second terminal S2 of the induction coil 300 increases, in order to start the rectification performed on the first terminal S1 of the induction coil 300. In addition, the operations of the discharge acceleration diode 144 allow the rectification control signal S12 to discharge rapidly when the voltage on the second terminal S2 of the induction coil 300 decreases. As a result, the turned-off speed of the rectification transistor 12 may be increased during the rectification switching process.

Please keep referring to FIG. 5A. The rectification stop control transistor 146, coupled to the processor 60 and the drain terminal of the rectification control transistor 14, is used for controlling the rectification control signal S12 to keep turning off the rectification transistor 12, to interrupt the rectification on the first terminal S1 of the induction coil 300 when the modulation control module M2 performs modulation on the second terminal S2 of the induction coil 300. In detail, signal modulation generates a low resistance path between the induction coil 300 and the ground terminal, in order to pull low the coil signals on the first terminal S1 or the second terminal S2 of the induction coil 300 when the first terminal S1 or the second terminal S2 is in a higher voltage level. At this moment, the rectification performed on the opposite side of the induction coil 300 should be interrupted, to prevent a large current from passing through the rectification diode and consuming great power due to the operations of pulling low the coil signals. In other words, the rectification performed on the first terminal S1 of the induction coil 300 should be interrupted when the second terminal S2 of the induction coil 300 is being modulated, and the rectification performed on the second terminal S2 of the induction coil 300 should be interrupted when the first terminal S1 of the induction coil 300 is being modulated. In such a situation, when the processor 60 turns on the modulation transistor 23 to perform modulation on the second terminal S2 of the induction coil 300 via the modulation control signal C23, the processor 60 may also turn on the rectification stop control transistor 146 via the rectification stop control signal C14 at the same time, allowing the rectification control signal S12 to fall to the zero voltage, in order to keep turning off the rectification transistor 12. In addition, the protection diode 145, coupled between the gate terminal of the rectification control transistor 14 and the ground terminal, is used for limiting the gate voltage of the rectification control transistor 14 within a specific range. That is, according to the characteristics of the rectification control transistor 14, the protection diode 145 may restrict the gate voltage of the rectification control transistor 14 to be under an upper limit, in order to prevent the gate voltage of the rectification control transistor 14 from exceeding the withstand voltage of the rectification control transistor 14, causing the rectification control transistor 14 to be burnt. In general, the protection diode 145 may be realized by a zener diode, but should not be limited herein.

On the other hand, as shown in FIG. 5B, the rectification control module R2 includes a rectification control transistor 24, voltage transformer resistors 241 and 243, discharge acceleration diodes 242 and 244, a rectification stop control transistor 246 and a protection diode 245. The rectification control transistor 24 is an NMOS transistor, of which the drain terminal is coupled to the rectification transistor 22, for outputting the rectification control signal S22 to the rectification transistor 22; the source terminal is coupled to the ground terminal; and the gate terminal is coupled to the second terminal S2 of the induction coil 300 via the voltage transformer resistor 241 and the discharge acceleration diode 242, to be controlled by the voltage on the second terminal S2 of the induction coil 300. The voltage transformer resistor 241 is coupled between the second terminal S2 of the induction coil 300 and the gate terminal of the rectification control transistor 24, for controlling the gate voltage of the rectification control transistor 24 to vary with the voltage on the second terminal S2 of the induction coil 300. Further, the discharge acceleration diode 242 is also coupled between the second terminal S2 of the induction coil 300 and the gate terminal of the rectification control transistor 24. When the voltage on the second terminal S2 of the induction coil 300 decreases, the discharge acceleration diode 242 may accelerate the speed of decreasing the gate voltage of the rectification control transistor 24 to rapidly turn off the rectification control transistor 24, in order to accelerate the speed of increasing the rectification control signal S22. Moreover, the voltage transformer resistor 243 is coupled between the first terminal S1 of the induction coil 300 and the drain terminal of the rectification control transistor 24, for controlling the rectification control signal S22 to vary with the voltage on the first terminal S1 of the induction coil 300. Further, the discharge acceleration diode 244 is also coupled between the first terminal S1 of the induction coil 300 and the drain terminal of the rectification control transistor 24. When the voltage on the first terminal S1 of the induction coil 300 decreases, the discharge acceleration diode 244 may accelerate the speed of decreasing the voltage of the rectification control signal S22. The rectification stop control transistor 246, coupled to the processor 60 and the drain terminal of the rectification control transistor 24, is used for controlling the rectification control signal S22 to keep turning off the rectification transistor 22, to interrupt the rectification on the second terminal S2 of the induction coil 300 when the modulation control module M1 performs modulation on the first terminal S1 of the induction coil 300. In such a situation, when the processor 60 turns on the modulation transistor 13 to perform modulation on the first terminal S1 of the induction coil 300 via the modulation control signal C13, the processor 60 may also turn on the rectification stop control transistor 246 via the rectification stop control signal C24 at the same time, allowing the rectification control signal S22 to fall to the zero voltage, in order to keep turning off the rectification transistor 22. In addition, the protection diode 245, coupled between the gate terminal of the rectification control transistor 24 and the ground terminal, is used for limiting the gate voltage of the rectification control transistor 24 within a specific range. For the detailed operations related to the rectification control module R2, the reader may be referred to the above descriptions of the rectification control module R1; this will not be narrated herein.

Figure 1:
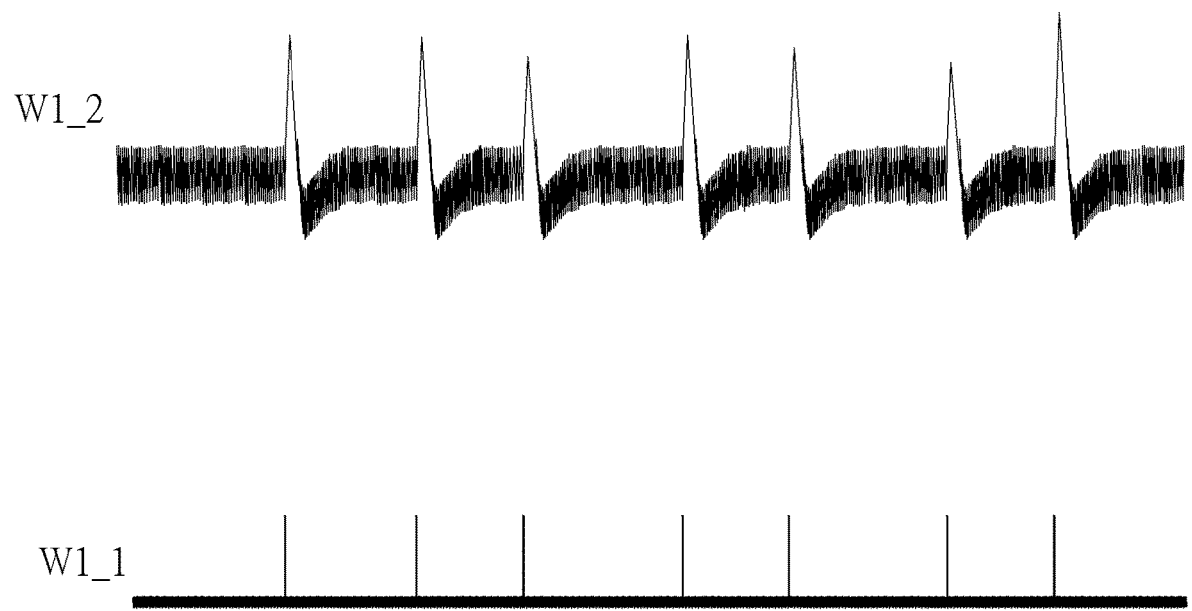
FIG. 1 is a waveform diagram of signal modulation.
Figure 2:
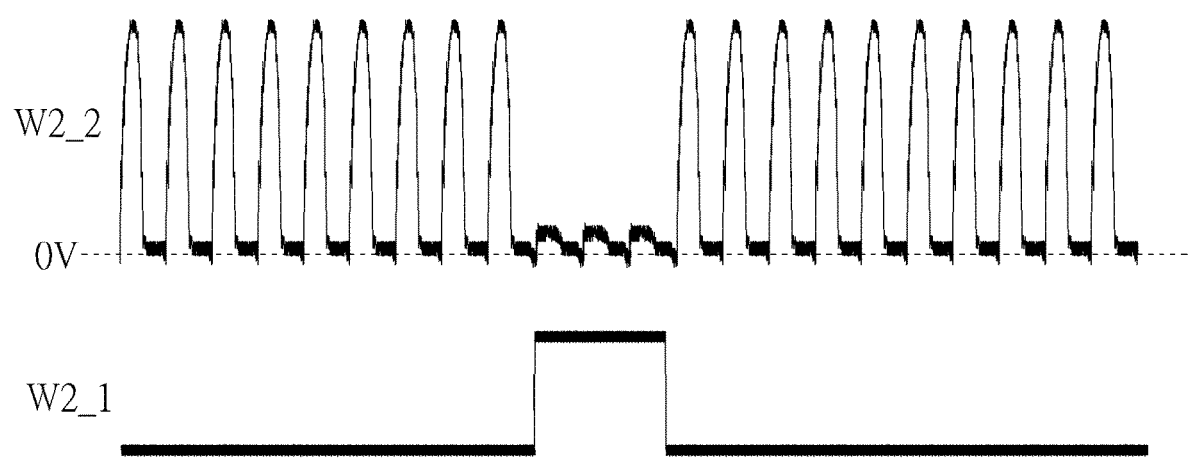
FIG. 2 is a waveform diagram of signals in a signal modulation period.
Figure 6:
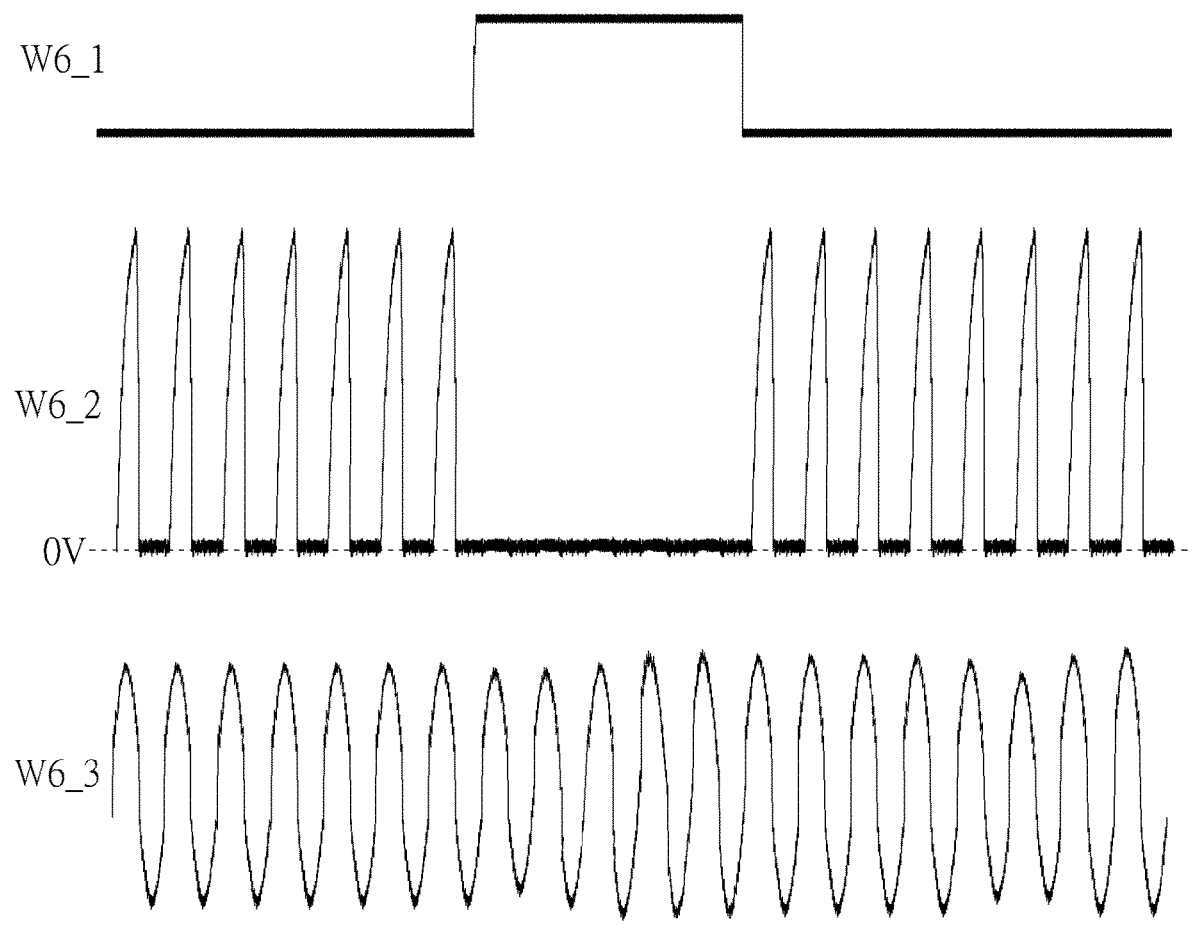
FIG. 6 is a waveform diagram of signals in the condition where signal modulation is performed in the receiving-end module.

In contrast to the prior art where the rectification control is only performed by a single resistor on each of the two terminals of the coil inputting the coil voltage to control the rectification transistor, in the embodiments of the present invention, the rectification control module is used to control the rectification transistor, in order to increase the speed of turning on and turning off the rectification transistor during the rectification switching process. The control signal (i.e., the gate voltage) of the rectification transistor can fully reach the zero voltage to keep turning off the rectification transistor, in order to prevent redundant power consumption from being generated when the rectification transistor does not fully turned off during the modulation. Please refer to FIG. 6, which is a waveform diagram of signals in the condition where signal modulation is performed in the receiving-end module 30. As shown in FIG. 6, the waveform W6_1 illustrates the modulation control signal C13 outputted to the modulation control module M1 by the processor 60, and it may also be regarded as the rectification stop control signal C24 outputted to the rectification control module R2 by the processor 60. The waveform W6_2 illustrates the rectification control signal S22 outputted by the rectification control module R2, i.e., the gate signal of the rectification transistor 22. The waveform W6_3 illustrates a waveform on the supplying-end coil fed back from the signal modulation of the receiving-end module 30. As can be seen in FIG. 6, when signal modulation is performed, signals may be fed back to the supplying-end coil, to generate variations on the amplitudes of signal oscillation. In contrast to the prior art where the rectification transistor cannot be fully turned off (as the waveform W2_2 shown in FIG. 2) when signal modulation is performed, the present invention may control the rectification transistor to be fully turned off when signal modulation is performed. This prevents redundant power consumption from being generated by the rectification transistor, in order to enhance the performance of signal modulation.

Please note that the present invention may achieve fast rectification switching without decreasing the current withstand capability according to the circuit structure in the receiving-end module 30. In detail, according to the characteristics of the MOSFET transistors, a transistor capable of withstanding a large current when turned on always has a larger parasitic capacitor, which limits the switching speed of the gate signal. On the other hand, a transistor having a smaller parasitic capacitor on its gate terminal with a high speed signal switching capability may have a worse current withstand capability. In such a situation, the rectification transistors applied in the prior art (e.g., the low-side switches A2 and B2 in U.S. Publication No. 2013/0342027 A1) are chosen from those with higher current withstand capability or higher rectification switching speed, so the rectification capability is limited. In contrast, in the receiving-end module 30 of the present invention, the rectification transistors 12 and 22 may be implemented with circuit elements having higher current withstand capability, in order to withstand a larger current on the induction coil 300. The rectification switching speed may be improved by the rectification control modules R1 and R2. That is, the rectification control transistors 14 and 24 in the rectification control modules R1 and R2 may be implemented with transistors having a faster switching speed, and the discharge acceleration diodes 142, 144, 242 and 244 are applied to accelerate the discharging speed on the gate terminal and drain terminal of the rectification control transistors 14 and 24, respectively. This increases the transition speed of the rectification control signals S12 and S22, in order to accelerate the speed of switching the rectification transistors 12 and 22. As a result, according to the embodiments of the present invention, both of the current withstand capability and the rectification switching speed can be enhanced.

As mentioned above, the present invention performs signal modulation on the two terminals of the induction coil in an alternation manner. Taking the receiving-end module 30 as an example, the processor 60 may alternately turn on the modulation control modules M1 and M2, to perform signal modulation on the first terminal S1 and the second terminal S2 of the induction coil 300, respectively, during different modulation periods. In detail, the processor 60 may configure a plurality of modulation periods corresponding to a modulation signal. Subsequently, during the $i^{th}$ modulation period among the plurality of modulation periods, the processor 60 may control the modulation control module M1 to perform modulation on the first terminal S1 of the induction coil 300, wherein i is an odd number; and during the $j^{th}$ modulation period among the plurality of modulation periods, the processor 60 may control the modulation control module M2 to perform modulation on the second terminal S2 of the induction coil 300, wherein j is an even number. In other words, in the receiving-end module 30, the second terminal S2 of the induction coil 300 does not undergo modulation when the first terminal S1 of the induction coil 300 is being modulated, and the first terminal S1 of the induction coil 300 does not undergo modulation when the second terminal S2 of the induction coil 300 is being modulated. Preferably, the number of modulation periods included in the plurality of modulation periods is even, so that the number of times the signal modulation performed on the first terminal S1 of the induction coil 300 is the same as that performed on the second terminal S2 of the induction coil 300.

In detail, during the $i^{th}$ modulation period, the processor 60 may turn on the modulation transistor 13 coupled to the first terminal S1 of the induction coil 300 via the modulation control signal C13, to perform modulation on the first terminal S1 of the induction coil 300. During the $j^{th}$ modulation period, the processor 60 may turn on the modulation transistor 23 coupled to the second terminal S2 of the induction coil 300 via the modulation control signal C23, to perform modulation on the second terminal S2 of the induction coil 300. In other words, the modulation transistors 13 and 23 are alternately turned on to generate the modulation signal. As mentioned above, when one terminal of the induction coil 300 is undergoing modulation, the opposite terminal should interrupt the rectification, in order to prevent a large current from passing through the rectification loop to consume great power. Since the signal modulation is performed on the two terminals of the induction coil 300 in an alternation manner, only one terminal interrupts the rectification and the other terminal still outputs power normally when signal modulation is performed. This reduces the influence on power output during the signal modulation periods. In contrast, in the prior art, signal modulation is performed on both terminals of the induction coil at the same time, so that both terminals should interrupt the rectification simultaneously, which causes the rectification output voltage to be reduced instantly and significantly, and therefore decreases the power output capability.

Figure 7:
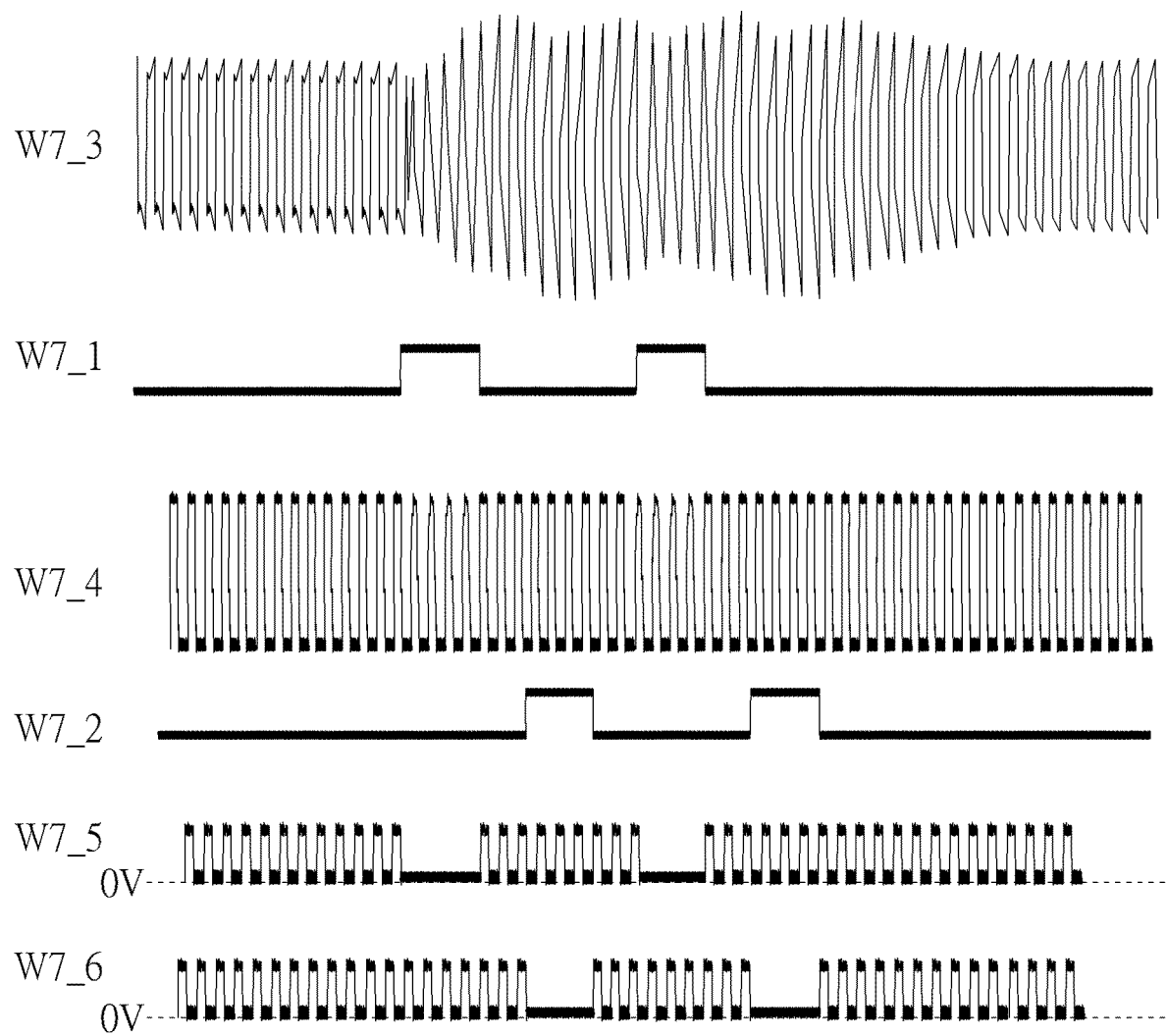
FIG. 7 is a waveform diagram of signals in the condition where signal modulation is performed in the receiving-end module.

Please refer to FIG. 7, which is a waveform diagram of signals in the condition where signal modulation is performed in the receiving-end module 30. As shown in FIG. 7, the waveform W7_1 illustrates the modulation control signal C13 outputted to the modulation control module M1 by the processor 60, the waveform W7_2 illustrates the modulation control signal C23 outputted to the modulation control module M2 by the processor 60, the waveform W7_3 illustrates a signal between the coil and capacitor in the induction coil 300, the waveform W7_4 illustrates the voltage signal on the first terminal S1 of the induction coil 300, the waveform W7_5 illustrates the rectification control signal S22 outputted to the rectification transistor 22 by the rectification control module R2, and the waveform W7_6 illustrates the rectification control signal S12 outputted to the rectification transistor 12 by the rectification control module R1. In FIG. 7, a modulation signal corresponds to 4 modulation periods, wherein only the modulation transistor 13 in the modulation control module M11 is turned on to perform signal modulation on the first terminal S1 of the induction coil 300 in the $1^{st}$ and the $3^{rd}$ modulation periods, and only the modulation transistor 23 in the modulation control module M2 is turned on to perform signal modulation on the second terminal S2 of the induction coil 300 in the $2^{nd}$ and the $4^{th}$ modulation periods. By the abovementioned signal modulation method, the electrical characteristics of the coil may vary, and the variations may be fed back to the power supply device and then analyzed and decoded to return to the modulation data. In addition, when signal modulation is performing on one terminal of the induction coil 300, the opposite terminal may stop the rectification. As can be seen in the waveforms W7_5 and W7_6, the rectification stop control transistors 146 and 246 may control the rectification control signals S12 and S22 to keep on the zero voltage, in order to fully turn off the rectification transistors 12 and 22. Further, the two terminals of the induction coil 300 may not stop the rectification at the same time; that is, there is at least one terminal performing rectification to output power on any time point, so that the signal modulation operations may not influence the performance of power output too seriously.

Please note that, in comparison with the conventional induction coils where both terminals undergo signal modulation simultaneously, the alternation-type modulation method of the present invention may also generate significant signal reflection on the supplying-end coil. Especially when there is a larger power load, the alternation-type modulation method of the present invention is more immune to the loading effect and able to maintain its signal modulation effect.

In addition, in the embodiment shown in FIG. 7, a modulation signal includes 4 modulation periods, but in other embodiments, there may be any number of modulation periods included in a modulation signal, and the length of modulation periods may be arbitrarily adjusted according to system requirements, as long as the length of each modulation period is substantially equal. Furthermore, in the above embodiment, the processor 60 triggers the modulation control signal C13 before triggering the modulation control signal C23. In other embodiments, the triggering order may change; that is, the processor 60 triggers the modulation control signal C23 before triggering the modulation control signal C13, which is not limited herein.

On the other hand, via the operations of the comparator and the reference voltage generator, the present invention also solves the drawbacks that every modulation signals fed back to the power supply device vary in amplitude as in the prior art. In contrast to the prior art where the modulation signals randomly occur on the oscillating cycles of the coil, in the embodiments of the present invention, the processor may detect the time points where the voltage levels of both terminals of the induction coil are switched via the comparator, in order to send the modulation control signals according to the switching cycles of the voltage levels (i.e., the switching cycle of rectification), so that each modulation signal may correspond to a fixed voltage level in the switching cycle. Please refer to FIG. 3 again, and take the receiving-end module 30 shown in FIG. 3 as an example. The processor 60 may configure a plurality of modulation periods corresponding to a modulation signal. Subsequently, the comparator 71 compares the coil voltage VS corresponding to the first terminal S1 or the second terminal S2 of the induction coil 300 with the reference voltage Vref to generate the comparison result CR, and outputs the comparison result CR to the processor 60. The processor 60 then determines the time points where the plurality of modulation periods start or stop according to the comparison result CR. In detail, an input terminal of the comparator 71 may receive the gate voltage of the rectification control transistor 14 in the rectification control module R1 or the gate voltage of the rectification control transistor 24 in the rectification control module R2. According to the circuit structure of the rectification control modules R1 and R2, the gate terminals of the rectification control transistors 14 and 24 are coupled to the first terminal S1 and the second terminal S2 of the induction coil 300, respectively, via the voltage transformer resistor 141 and the discharge acceleration diode 142 or the voltage transformer resistor 241 and the discharge acceleration diode 242. The gate voltages therefore vary with the coil voltage VS of the induction coil 300. In such a situation, the gate voltages of the rectification control transistors 14 and 24 may correspond to the coil voltage VS of the induction coil 300. The other input terminal of the comparator 71 receives the reference voltage Vref from the reference voltage generator 72, and the output terminal of the comparator 71 outputs the comparison result of the above gate voltage and the reference voltage Vref. The reference voltage Vref should be configured on a voltage level between the highest voltage level and lowest voltage level of the gate voltages of the rectification control transistors 14 and 24, in order to determine the voltage level on the two terminals of the induction coil 300.

Please note that the receiving-end module 30 only includes one comparator 71, which is connected to the rectification control module R1 to receive the gate voltage of the rectification control transistor 14. Since the switching cycles of the first terminal S1 and the second terminal S2 of the induction coil 300 are the same and their voltage levels are reverse, the comparator 71 should only obtain the cycle and voltage level corresponding to the first terminal S1 of the induction coil 300, and the cycle and voltage level corresponding to the second terminal S2 are obtained as well. In another embodiment, the comparator 71 may be connected to the rectification control module R2 instead, to obtain the cycle and voltage level corresponding to the second terminal S2 of the induction coil 300, which is not limited herein. In addition, the comparator 71 may obtain the coil voltage VS and switching cycle by other methods, which are not limited in the methods via the connections to the rectification control module R1 or R2.

Subsequently, the processor 60 may determine the time point where each modulation period starts or stops according to the comparison result CR (which includes the switching cycles and voltage levels of both terminals of the induction coil 300). The following example corresponds to the circuit structure of the receiving-end module 30 shown in FIG. 3, where the comparator 71 compares the coil voltage VS corresponding to the first terminal S1 of the induction coil 300 with the reference voltage Vref and generates the comparison result CR accordingly. Those skilled in the art may infer the case where the comparator 71 is connected to the second terminal S2 of the induction coil 300 from the content described in the present example.

First of all, the processor 60 may configure a predetermined time for each of the plurality of modulation periods corresponding to a modulation signal. In general, the predetermined time for each modulation period may be configured to be the same, and may be substantially equal to several (e.g., 3 or 4) switching cycles of the coil voltage VS. Subsequently, when the processor 60 receives an indication of signal modulation, the processor 60 may determine the voltage level of the first terminal S1 of the induction coil 300 according to the comparison result CR, and determine whether to start a modulation period corresponding to the first terminal S1 accordingly. A timer is also started when the modulation period starts. When the timer expires on the predetermined time (i.e., after several cycles pass by), the processor 60 may determine the voltage level of the first terminal S1 of the induction coil 300 according to the comparison result CR, and determine whether to stop the modulation period accordingly.

In detail, as for the starting time of the modulation period, the processor 60 may determine a time point where the voltage level of the first terminal S1 of the induction coil 300 falls to a low voltage level lower than the reference voltage Vref via the comparison result CR after receiving the indication of signal modulation, and starts the modulation period at the time point, i.e., turns on the modulation transistor 13 in the modulation control module M1, so that the first terminal S1 of the induction coil 300 starts to undergo modulation in the low voltage level. Similarly, as for the stopping time of the modulation period, the processor 60 may also determine a time point where the voltage level of the first terminal S1 of the induction coil 300 falls to a low voltage level lower than the reference voltage Vref via the comparison result CR after the predetermined time is reached, and stops the modulation period at the time point, i.e., turns off the modulation transistor 13 in the modulation control module M1, so that the first terminal S1 of the induction coil 300 stops undergoing modulation in the low voltage level. Note that signal modulation is operated by pulling low the voltage signals on the first terminal S1 or the second terminal S2 of the induction coil 300 via the modulation transistor 13 or 23 coupled to the first terminal S1 or the second terminal S2 of the induction coil 300, respectively. In such a condition, since the voltage signals on the first terminal S1 and the second terminal S2 of the induction coil 300 are similar to a square wave, of which the lower voltage level approaches to the zero voltage and cannot be pulled low to generate modulation effects, only parts in the voltage signals with a higher voltage level may be influenced by modulation. In other words, the processor 60 may control the signal modulation operations to start or stop when the corresponding coil voltage VS is in the lower voltage level, i.e., where the coil voltage VS does not have modulation effects, according to the comparison result CR; hence, the signal modulation period may include entire switching cycles of the coil voltage VS, i.e., several entire periods where the coil voltage VS is in the higher voltage level. Furthermore, the predetermined time corresponding to each modulation period is the same, so each modulation period may include the same number of entire switching cycles of the coil voltage VS. As a result, each modulation signal may generate the same level of signal variations on the amplitude of the coil, which enhances the accuracy of signal determination on the power supply device.

On the other hand, the comparison result CR generated by the comparator 71 comparing the voltage level of the first terminal S1 of the induction coil 300 with the reference voltage Vref may also be used for determining the voltage level of the second terminal S2 of the induction coil 300. In detail, when the processor 60 receives an indication of signal modulation and needs to perform modulation on the second terminal S2 of the induction coil 300, the processor 60 may determine the voltage level of the first terminal S1 of the induction coil 300 according to the comparison result CR in order to determine the voltage level of the second terminal S2 of the induction coil 300, and determine whether to start a modulation period corresponding to the second terminal S2 accordingly. The timer is also started when the modulation period starts. When the timer expires on the predetermined time (i.e., after several cycles pass by), the processor 60 may determine the voltage level of the first terminal S1 of the induction coil 300 according to the comparison result CR in order to determine the voltage level of the second terminal S2 of the induction coil 300, and determine whether to stop the modulation period accordingly. As mentioned above, the signals on the first terminal S1 and the second terminal S2 of the induction coil 300 are reverse; that is, the second terminal S2 is in the low voltage level when the first terminal S1 is in the high voltage level, and in the high voltage level when the first terminal S1 is in the low voltage level. Therefore, only one comparator 71 is enough to obtain the voltage levels on the two terminals of the induction coil 300.

In detail, as for the starting time of the modulation period, the processor 60 may determine a time point where the voltage level of the first terminal S1 of the induction coil 300 rises to a high voltage level higher than the reference voltage Vref via the comparison result CR after receiving the indication of signal modulation, and determine that the second terminal S2 of the induction coil 300 is in a low voltage level accordingly. The processor 60 thereby starts the modulation period at the time point, i.e., turns on the modulation transistor 23 in the modulation control module M2, so that the second terminal S2 of the induction coil 300 starts to undergo modulation in the low voltage level. Similarly, as for the stopping time of the modulation period, the processor 60 may also determine a time point where the voltage level of the first terminal S1 of the induction coil 300 rises to a high voltage level higher than the reference voltage Vref via the comparison result CR after the predetermined time is reached, and determine that the second terminal S2 of the induction coil 300 is in a low voltage level accordingly. The processor 60 thereby stops the modulation period at the time point, i.e., turns off the modulation transistor 23 in the modulation control module M2, so that the second terminal S2 of the induction coil 300 stops undergoing modulation in the low voltage level.

Figure 8A:
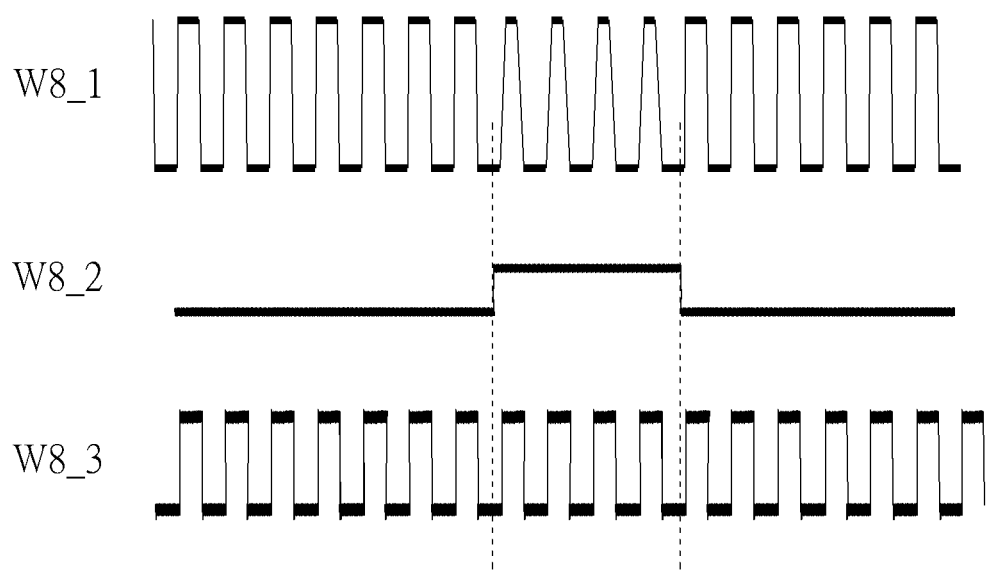
FIG. 8A and FIG. 8B are waveform diagrams of signals in the condition where signal modulation is performed in the receiving-end module.
Figure 8B:
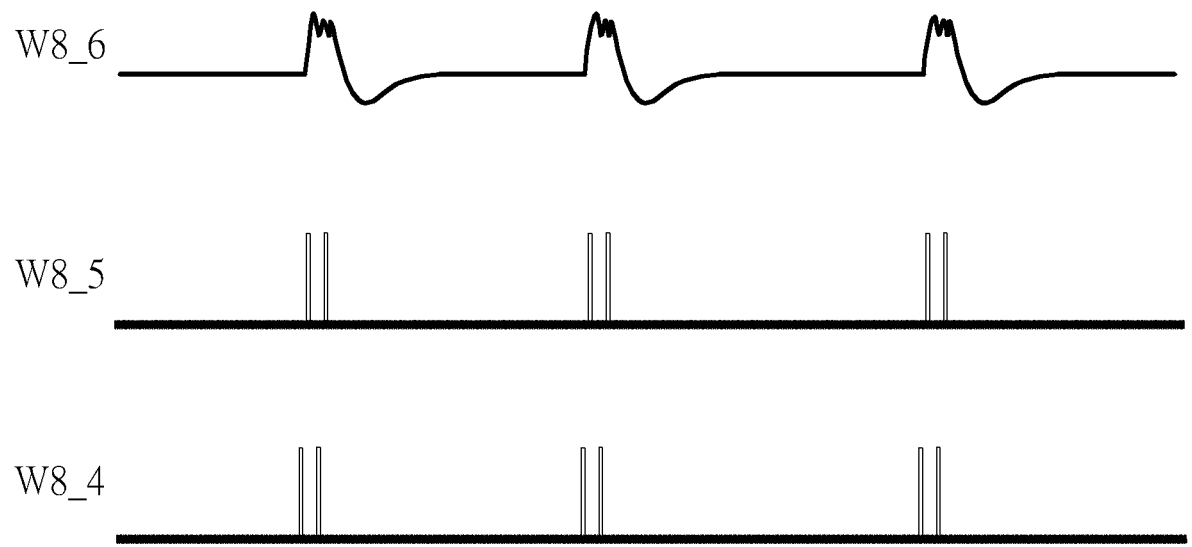

Please refer to FIG. 8A and FIG. 8B, which are waveform diagrams of signals in the condition where signal modulation is performed in the receiving-end module 30. FIG. 8A illustrates amplifications of several waveforms shown in FIG. 7, to definitely illustrate the relations between the starting and stopping time points of the modulation period and the coil voltage VS. FIG. 8B illustrates a waveform of multiple modulation signals. As shown in FIG. 8A, the waveform W8_1, as an amplified version of the waveform W7_4, illustrates the voltage signal on the first terminal S1 of the induction coil 300. The waveform W8_2, as an amplified version of the waveform W7_1, illustrates the modulation control signal C13. The waveform W8_3 illustrates the comparison result CR outputted by the comparator 71. As can be seen in FIG. 8A, both of the starting and stopping time points of the modulation control signal C13 occur when the first terminal S1 of the induction coil 300 is in the low voltage level, i.e., the comparison result CR is in a lower voltage level. In general, the switching speed of the coil voltage VS is quite fast, and the processing delay of the processor 60 may cause that the modulation control signal C13 cannot be turned on or off exactly on the time point where the coil voltage VS is switched to the low voltage level. However, it is ensured that the modulation period may include entire switching cycles of the coil voltage VS (i.e., several entire periods where the coil voltage VS is in the high voltage level) as long as the modulation control signal C13 is turned on or off when the first terminal S1 of the induction coil 300 is in the low voltage level. For example, as shown in FIG. 8A, a modulation period (i.e., the time when the modulation control signal C13 turns on the modulation transistor 13) includes 4 entire periods where the coil voltage VS is in the higher voltage level.

In addition, as shown in FIG. 8B, the waveforms W8_4 and W8_5 illustrate the modulation control signals C13 and C23, respectively. The waveform W8_6 illustrates the signals obtained from the modulation signals generated by the receiving-end module 30 and then reflected to the power supply device and processed by the signal analysis circuit. As can be seen in FIG. 8B, each modulation signal includes the same number of entire switching cycles of the coil voltage VS; hence, the varied amplitudes and variation types of the signals generated on the coil are all the same, and the signal waveforms after being reflected to the power supply device and processed by the signal analysis are also the same.

Please note that the comparator 71 may not only control the time points of the signal modulation performed by the processor 60, but also control the operations of the processor 60. In the prior art, whether to turn on the processor is determined according to whether the input voltage received by the processor reaches its operation voltage. Since the voltage regulator in the power output terminal of the receiving-end module applies a regulating capacitor having a large capacitance value, a switch should be disposed between the regulating capacitor and the processor and the switch should be open before the processor is turned on, in order to prevent the power outputted via rectification of the induction coil from being absorbed by the regulating capacitor. This slows the speed of increasing the input voltage of the processor and therefore delays the time of turning on the processor or even fails to turn on the processor if the input voltage cannot reach its operation voltage. For example, in the receiving-end module 20 described in U.S. Publication No. 2013/0342027 A1, the protection circuit breaker 24 is used for dealing with this problem. In contrast, the receiving-end module 30 in the embodiments of the present invention may determine whether to turn on the processor 60 according to the comparison result CR outputted by the comparator 71. In detail, when the receiving-end module 30 approaches to a power supply device or is put on a power supply device, the power supply device may transmit little power. The induction coil 300 in the receiving-end module 30 may start to resonate after receiving the power; that is, voltage variations may be generated on both terminals of the induction coil 300. Such voltage variations may be transmitted to the comparator 71 via the rectification control module R1 or R2, and thereby generate the comparison result CR which is continuously switched between the higher and lower voltage levels. After receiving the comparison result CR, the processor 60 may determine that the receiving-end module 30 is near a power supply device, and start to generate modulation signals to be reflected to the power supply terminal. On the other hand, when the receiving-end module 30 of the induction coil 300 leaves the power supply terminal, the induction coil 300 may also stop resonating immediately. Even if the charges existing in the regulating capacitor 41 are still enough for enabling the processor 60, the processor 60 may still learn that the induction coil 300 has stopped receiving power and stop related operations accordingly via the comparator 71. In such a situation, the processor 60 performs operations according to the comparison result CR rather than according to the received voltage; hence, in the receiving-end module 30 of the present invention, the rectification diodes 11 and 21 may directly output power to the voltage regulator 40 and the power output terminal 50, where no switch is required previous to the regulating capacitor 41.

In this case, the power received by the induction coil 300 may be directly transmitted to the voltage regulator 40 and the power output terminal 50 after undergoing rectification without passing through any switch, so power loss caused by the current passing through the switch may be prevented. In the prior art, the regulating capacitor is disposed behind the switch, and the regulating capacitor may absorb a large number of charges causing the voltage to fall instantly and significantly when the switch is turned on, such that the processor may not operate normally if the voltage falls excessively. In contrast, the embodiments of the present invention do not require any switch to isolate the regulating capacitor and the processor, so this problem may be prevented.

Figure 9:
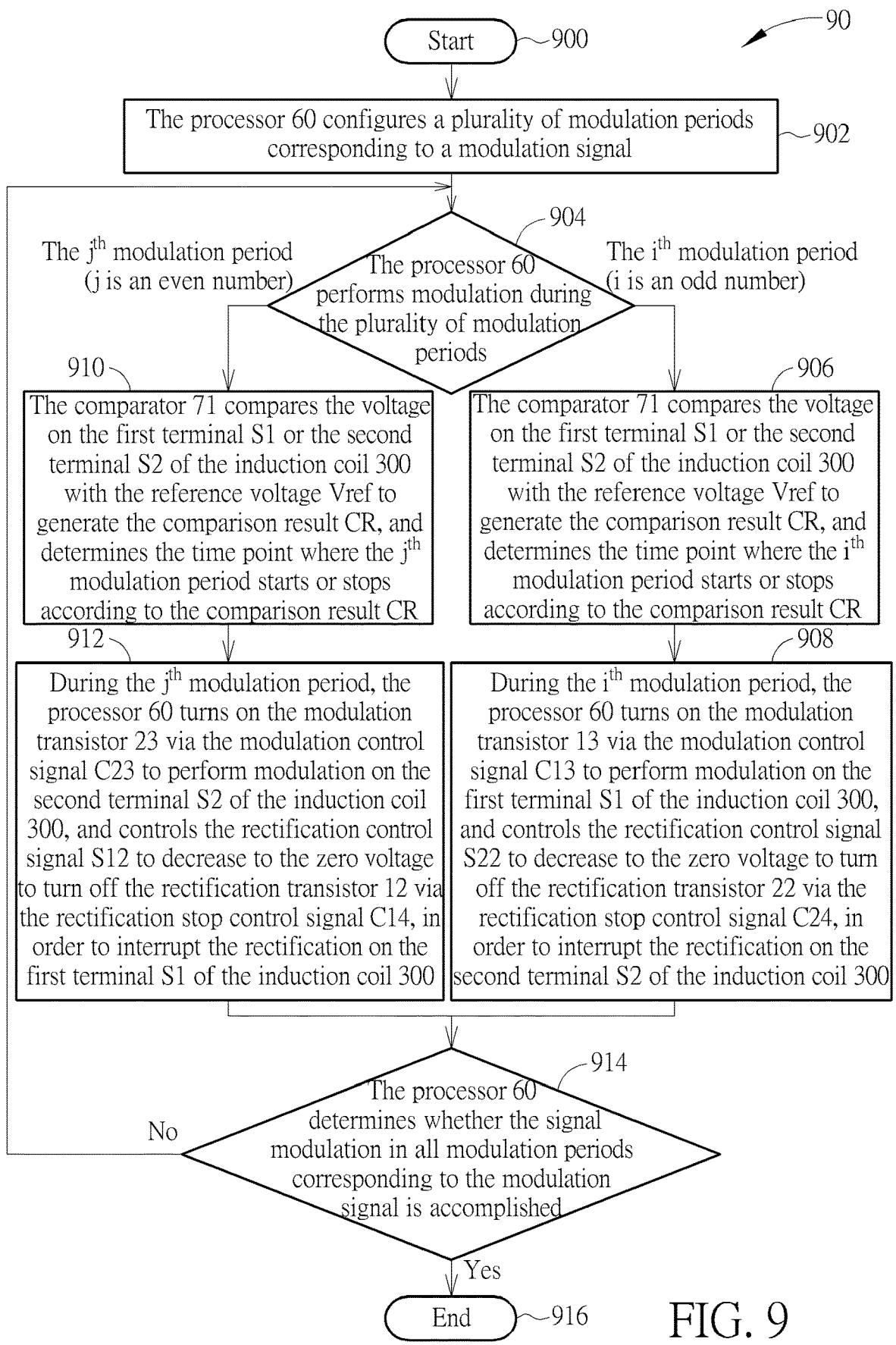
FIG. 9 is a schematic diagram of a signal modulation process according to an embodiment of the present invention.

The abovementioned operations related to the receiving-end module 30 may be summarized into a signal modulation process 90, as shown in FIG. 9. The signal modulation process 90 includes the following steps:

Step 900: Start.

Step 902: The processor 60 configures a plurality of modulation periods corresponding to a modulation signal.

Step 904: The processor 60 performs modulation during the plurality of modulation periods. For the $i^{th}$ modulation period (i is an odd number), go to Step 906; for the $j^{th}$ modulation period (j is an even number), go to Step 910.

Step 906: The comparator 71 compares the voltage on the first terminal S1 or the second terminal S2 of the induction coil 300 with the reference voltage Vref to generate the comparison result CR, and determines the time point where the $i^{th}$ modulation period starts or stops according to the comparison result CR.

Step 908: During the $i^{th}$ modulation period, the processor 60 turns on the modulation transistor 13 via the modulation control signal C13 to perform modulation on the first terminal S1 of the induction coil 300, and controls the rectification control signal S22 to decrease to the zero voltage to turn off the rectification transistor 22 via the rectification stop control signal C24, in order to interrupt the rectification on the second terminal S2 of the induction coil 300. Then, go to Step 914.

Step 910: The comparator 71 compares the voltage on the first terminal S1 or the second terminal S2 of the induction coil 300 with the reference voltage Vref to generate the comparison result CR, and determines the time point where the $j^{th}$ modulation period starts or stops according to the comparison result CR.

Step 912: During the $j^{th}$ modulation period, the processor 60 turns on the modulation transistor 23 via the modulation control signal C23 to perform modulation on the second terminal S2 of the induction coil 300, and controls the rectification control signal S12 to decrease to the zero voltage to turn off the rectification transistor 12 via the rectification stop control signal C14, in order to interrupt the rectification on the first terminal S1 of the induction coil 300.

Step 914: The processor 60 determines whether the signal modulation in all modulation periods corresponding to the modulation signal is accomplished. If yes, go to Step 916; otherwise, go to Step 904.

Step 916: End.

The detailed operations and variations related to the signal modulation process 90 are illustrated in the above paragraphs, and will not be narrated herein.

To sum up, the present invention performs signal modulation in an alternation manner; that is, performs signal modulation on the first terminal and the second terminal of the induction coil alternately. This signal modulation method may generate evident signal reflection on the power supply device. The rectification transistors on two terminals of the induction coil should not be turned off simultaneously, which reduces the influence on power output during the signal modulation periods. In addition, via the operations of the comparator, the time points of signal modulation may correspond to the switching cycle of the coil voltage. The processor may start or stop the signal modulation on a specific time point according to the comparison result of the comparator, so that each modulation signal may generate the same level of signal variations on the coil, which enhances the accuracy of signal determination on the power supply device. Furthermore, whether to turn on the processor may also be determined via the comparator according to switching of the coil voltage, rather than the received operation voltage of the process; hence, the switch disposed between the regulating capacitor and the processor for controlling the operation voltage of the processor is not required. Moreover, according to the circuit structure in the receiving-end module of the present invention, the rectification transistors may be controlled by the rectification control modules, to realize high current withstand capability and high rectification switching speed simultaneously.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal modulation method for a receiving-end module of an induction type power supply system, the signal modulation method comprising:
    configuring a plurality of modulation periods corresponding to a modulation signal;
    performing modulation on a first terminal of an induction coil of the receiving-end module during an ith modulation period among the plurality of modulation periods, wherein i is an odd number; and performing the modulation on a second terminal of the induction coil of the receiving-end module during a jth modulation period among the plurality of modulation periods, wherein j is an even number;
    wherein the second terminal does not undergo the modulation when the first terminal is being modulated, and the first terminal does not undergo the modulation when the second terminal is being modulated.

2. The signal modulation method of claim 1, further comprising:
    turning on a first modulation transistor coupled to the first terminal of the induction coil to perform the modulation on the first terminal of the induction coil during the ith modulation period; and
    turning on a second modulation transistor coupled to the second terminal of the induction coil to perform the modulation on the second terminal of the induction coil during the jth modulation period.

3. The signal modulation method of claim 2, wherein the first modulation transistor and the second modulation transistor are alternately turned on to generate the modulation signal.

4. The signal modulation method of claim 1, wherein the number of modulation periods included in the plurality of modulation periods is even.

5. The signal modulation method of claim 1, further comprising:
    turning off a first rectification transistor coupled to the first terminal of the induction coil to interrupt rectification on the first terminal of the induction coil when performing the modulation on the second terminal of the induction coil; and
    turning off a second rectification transistor coupled to the second terminal of the induction coil to interrupt the rectification on the second terminal of the induction coil when performing the modulation on the first terminal of the induction coil.

6. A signal rectification and modulation device for a receiving-end module of an induction type power supply system, the receiving-end module comprising an induction coil for receiving power from a supplying-end module of the induction type power supply system, the rectification and modulation device comprising:
    a first rectification transistor, coupled between a first terminal of the induction coil and a ground terminal, for performing rectification on the first terminal of the induction coil;
    a second rectification transistor, coupled between a second terminal of the induction coil and the ground terminal, for performing the rectification on the second terminal of the induction coil;
    a first rectification control module, coupled to the first terminal and the second terminal of the induction coil and the first rectification transistor, for outputting a first rectification control signal to control the first rectification transistor to perform the rectification according to voltages on the first terminal and the second terminal of the induction coil;
    a second rectification control module, coupled to the first terminal and the second terminal of the induction coil and the second rectification transistor, for outputting a second rectification control signal to control the second rectification transistor to perform the rectification according to the voltages on the first terminal and the second terminal of the induction coil;
    a first modulation control module, coupled to the first terminal of the induction coil, for performing signal modulation on the first terminal;
    a second modulation control module, coupled to the second terminal of the induction coil, for performing the signal modulation on the second terminal; and
    a processor, coupled to a comparator, the first rectification control module, the second rectification control module, the first modulation control module and the second modulation control module, for controlling the first modulation control module and the second modulation control module to alternately perform the signal modulation on the first terminal and the second terminal of the induction coil;

wherein the processor controls the second rectification control module to turn off the second rectification transistor to interrupt the rectification on the second terminal of the induction coil when controlling the first modulation control module to perform the signal modulation on the first terminal of the induction coil, and controls the first rectification control module to turn off the first rectification transistor to interrupt the rectification on the first terminal of the induction coil when controlling the second modulation control module to perform the signal modulation on the second terminal of the induction coil.

7. The signal rectification and modulation device of claim 6, further comprising:
 a first rectification diode, coupled between the first terminal of the induction coil and a power output terminal, for outputting power to the power output terminal; and
 a second rectification diode, coupled between the second terminal of the induction coil and the power output terminal, for outputting power to the power output terminal.

8. The signal rectification and modulation device of claim 7, wherein the receiving-end module further comprises:
 a voltage regulator, controlled by the processor, for receiving power from the induction coil; and
 a regulating capacitor, coupled between the voltage regulator, the first rectification diode and the second rectification diode, for stabilizing the power received by the voltage regulator;
 wherein there is no switch between the first rectification diode, the second rectification diode and the regulating capacitor.

9. The signal rectification and modulation device of claim 6, further comprising:
 a first protection diode, coupled between a gate terminal of the first rectification transistor and the ground terminal, for limiting a gate voltage of the first rectification transistor within a first specific range; and
 a second protection diode, coupled between a gate terminal of the second rectification transistor and the ground terminal, for limiting a gate voltage of the second rectification transistor within a second specific range.

10. The signal rectification and modulation device of claim 6, wherein the first rectification control module comprises:
 a rectification control transistor, for controlling the first rectification control signal to reach a zero voltage when turned on, the rectification control transistor comprising:
 a drain terminal, coupled to the first rectification transistor;
 a source terminal, coupled to the ground terminal; and
 a gate terminal;
 a first voltage transformer resistor, coupled between the second terminal of the induction coil and the drain terminal of the rectification control transistor, for controlling the first rectification control signal to vary with the voltage on the second terminal of the induction coil;
 a first discharge acceleration diode, coupled between the second terminal of the induction coil and the drain terminal of the rectification control transistor, for accelerating a speed of decreasing the first rectification control signal when the voltage on the second terminal of the induction coil decreases;
 a second voltage transformer resistor, coupled between the first terminal of the induction coil and the gate terminal of the rectification control transistor, for controlling a gate voltage of the rectification control transistor to vary with the voltage on the first terminal of the induction coil;
 a second discharge acceleration diode, coupled between the first terminal of the induction coil and the gate terminal of the rectification control transistor, for accelerating a speed of decreasing the gate voltage of the rectification control transistor to rapidly turn off the rectification control transistor, in order to accelerate a speed of increasing the first rectification control signal when the voltage on the first terminal of the induction coil decreases;
 a rectification stop control transistor, coupled to the processor and the drain terminal of the rectification control transistor, for controlling the first rectification control signal to turn off the first rectification transistor, to interrupt the rectification on the first terminal of the induction coil when the second modulation control module performs the signal modulation on the second terminal of the induction coil; and
 a protection diode, coupled between the gate terminal of the rectification control transistor and the ground terminal, for limiting the gate voltage of the rectification control transistor within a specific range.

11. The signal rectification and modulation device of claim 6, wherein the second rectification control module comprises:
 a rectification control transistor, for controlling the second rectification control signal to reach a zero voltage when turned on, the rectification control transistor comprising:
 a drain terminal, coupled to the second rectification transistor;
 a source terminal, coupled to the ground terminal; and
 a gate terminal;
 a first voltage transformer resistor, coupled between the first terminal of the induction coil and the drain terminal of the rectification control transistor, for controlling the second rectification control signal to vary with the voltage on the first terminal of the induction coil;
 a first discharge acceleration diode, coupled between the first terminal of the induction coil and the drain terminal of the rectification control transistor, for accelerating a speed of decreasing the second rectification control signal when the voltage on the first terminal of the induction coil decreases;
 a second voltage transformer resistor, coupled between the second terminal of the induction coil and the gate terminal of the rectification control transistor, for controlling a gate voltage of the rectification control transistor to vary with the voltage on the second terminal of the induction coil;
 a second discharge acceleration diode, coupled between the second terminal of the induction coil and the gate terminal of the rectification control transistor, for accelerating a speed of decreasing the gate voltage of the rectification control transistor to rapidly turn off the rectification control transistor, in order to accelerate a speed of increasing the second rectification control signal when the voltage on the second terminal of the induction coil decreases;

a rectification stop control transistor, coupled to the processor and the drain terminal of the rectification control transistor, for controlling the second rectification control signal to turnoff the second rectification transistor, to interrupt the rectification on the second terminal of the induction coil when the first modulation control module performs the signal modulation on the first terminal of the induction coil; and a protection diode, coupled between the gate terminal of the rectification control transistor and the ground terminal, for limiting the gate voltage of the rectification control transistor within a specific range.

12. The signal rectification and modulation device of claim 10, wherein a current withstand capability of the rectification control transistor is smaller than a current withstand capability of the first rectification transistor and the second rectification transistor, and a switching speed of the rectification control transistor is greater than a switching speed of the first rectification transistor and the second rectification transistor.

13. The signal rectification and modulation device of claim 11, wherein a current withstand capability of the rectification control transistor is smaller than a current withstand capability of the first rectification transistor and the second rectification transistor, and a switching speed of the rectification control transistor is greater than a switching speed of the first rectification transistor and the second rectification transistor.

14. The signal rectification and modulation device of claim 6, wherein the first modulation control module comprises:

a modulation transistor, controlled by the processor, for performing the signal modulation on the first terminal of the induction coil; and a modulation load resistor, coupled between the modulation transistor and the first terminal of the induction coil, for providing a load required by the signal modulation.

15. The signal rectification and modulation device of claim 6, wherein the second modulation control module comprises:

a modulation transistor, controlled by the processor, for performing the signal modulation on the second terminal of the induction coil; and a modulation load resistor, coupled between the modulation transistor and the second terminal of the induction coil, for providing a load required by the signal modulation.

16. The signal rectification and modulation device of claim 6, wherein the processor executes the following steps to perform the signal modulation:

configuring a plurality of modulation periods corresponding to a modulation signal;

controlling the first modulation control module to perform modulation on the first terminal of the induction coil during an ith modulation period among the plurality of modulation periods, wherein i is an odd number; and controlling the second modulation control module to perform modulation on the second terminal of the induction coil during a jth modulation period among the plurality of modulation periods, wherein j is an even number;

wherein the second terminal does not undergo the signal modulation when the first terminal is being modulated, and the first terminal does not undergo the signal modulation when the second terminal is being modulated.

17. The signal rectification and modulation device of claim 16, wherein the processor turns on a modulation transistor in the first modulation control module and another modulation transistor in the second modulation control module alternately, to generate the modulation signal.

* * * * *